US012597028B2

(12) United States Patent (10) Patent No.: US 12,597,028 B2
Yang et al. (45) Date of Patent: Apr. 7, 2026

(54) SYSTEMS AND METHODS FOR GENERATING, PROVIDING, AND MANAGING CUSTOM NOTIFICATIONS

(71) Applicant: Wells Fargo Bank, N.A., San Francisco, CA (US)

(72) Inventors: Young M. Yang, San Francisco, CA (US); Jenny Yee Tao, San Francisco, CA (US); Eric J. Miller, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 191 days.

(21) Appl. No.: 18/220,687

(22) Filed: Jul. 11, 2023

(65) Prior Publication Data

US 2025/0021976 A1 Jan. 16, 2025

(51) Int. Cl.
G06Q 20/40 (2012.01)
G06Q 20/42 (2012.01)

(52) U.S. Cl.
CPC ........... G06Q 20/401 (2013.01); G06Q 20/42 (2013.01)

(58) Field of Classification Search
CPC ............................................ G06Q 20/00–425
See application file for complete search history.

(56) References Cited

U.S. PATENT DOCUMENTS

| | | | | |
|---|---|---|---|---|
| 8,856,043 B2 * | 10/2014 | Faith | .................... | G06Q 20/401 |
| | | | | 705/44 |
| 10,129,250 B2 * | 11/2018 | Oberheide | ............ | H04W 12/08 |
| 11,315,123 B2 * | 4/2022 | Ross | .................... | G06Q 20/027 |
| 11,423,392 B1 | 8/2022 | Ho et al. | | |
| 11,816,651 B1 * | 11/2023 | Maeng | .................. | G06Q 20/36 |
| 2010/0114686 A1 | 5/2010 | Carlson et al. | | |
| 2010/0190471 A1 * | 7/2010 | Smith | .................. | G06Q 20/204 |
| | | | | 455/408 |
| 2016/0086188 A1 | 3/2016 | Candelore et al. | | |
| 2018/0005203 A1 | 1/2018 | Grassadonia et al. | | |
| 2020/0082429 A1 * | 3/2020 | Kaja | .................... | G06Q 20/227 |
| 2022/0129904 A1 | 4/2022 | Gerling-Ospina et al. | | |

* cited by examiner

*Primary Examiner* — Mohammad A. Nilforoush
(74) *Attorney, Agent, or Firm* — Foley & Lardner LLP

(57) ABSTRACT

A computer-implemented method includes: receiving, by a computing system, from a first device, a request to perform an activity associated with an account of a plurality of accounts of a provider institution; determining, by the computing system, based on the activity, a notification policy based on a notification setting of the account associated with a user; transmitting, by the computing system, a request for information regarding the activity to the first device; receiving, by the computing system, information regarding the activity from the first device; generating, by the computing system, a data payload comprising the received information regarding the activity and initial information associated with the request to perform the activity; retrieving, by the computing system, an address associated with the account; and providing, by the computing system, a notification comprising information from the data payload to a second device associated with the user based on the retrieved address.

20 Claims, 8 Drawing Sheets

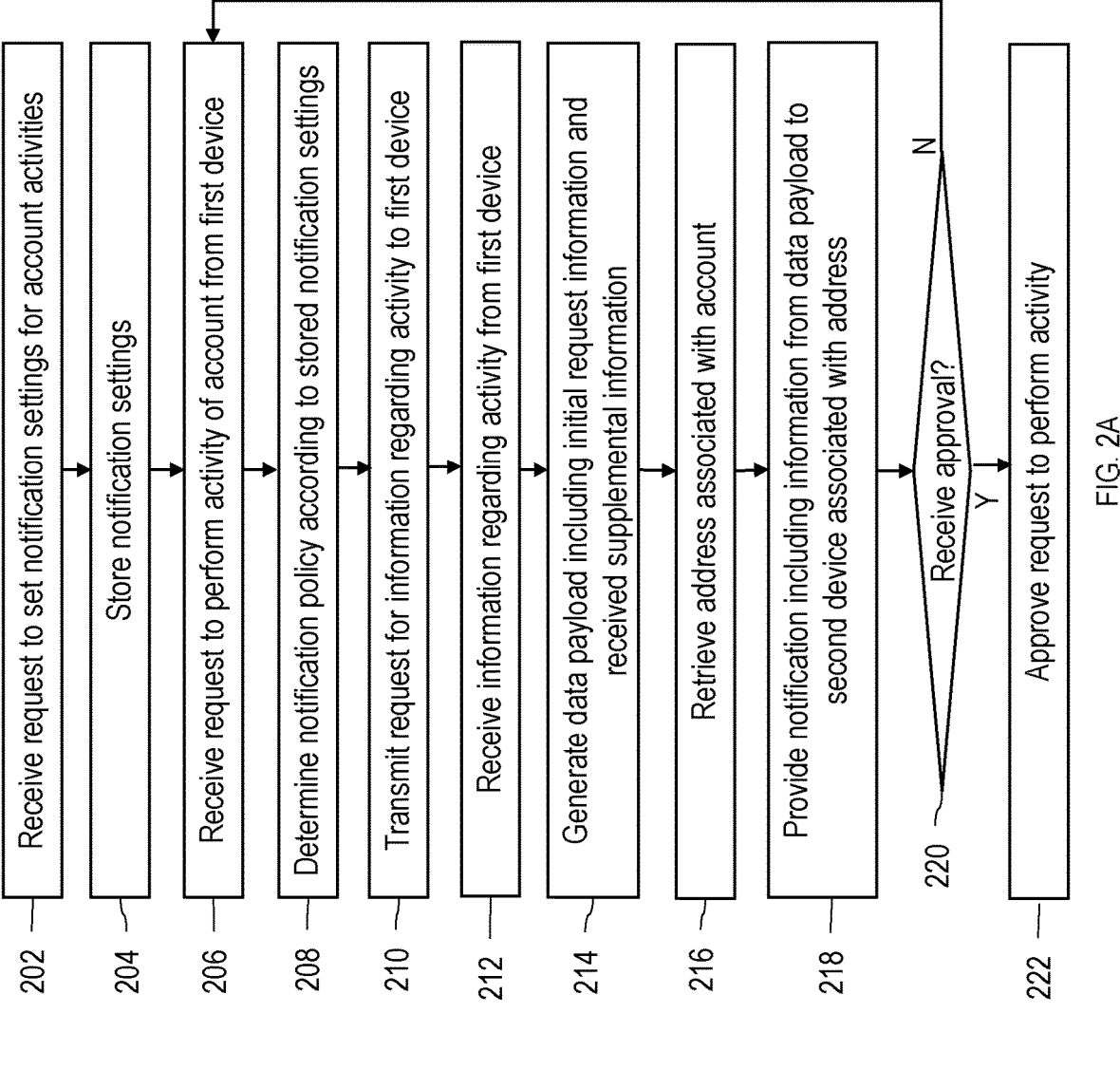

200

202 — Receive request to set notification settings for account activities

204 — Store notification settings

206 — Receive request to perform activity of account from first device

208 — Determine notification policy according to stored notification settings

210 — Transmit request for information regarding activity to first device

212 — Receive information regarding activity from first device

214 — Generate data payload including initial request information and received supplemental information 216 — Retrieve address associated with account 218 — Provide notification including information from data payload to second device associated with address 220 — Receive approval?

222 — Approve request to perform activity

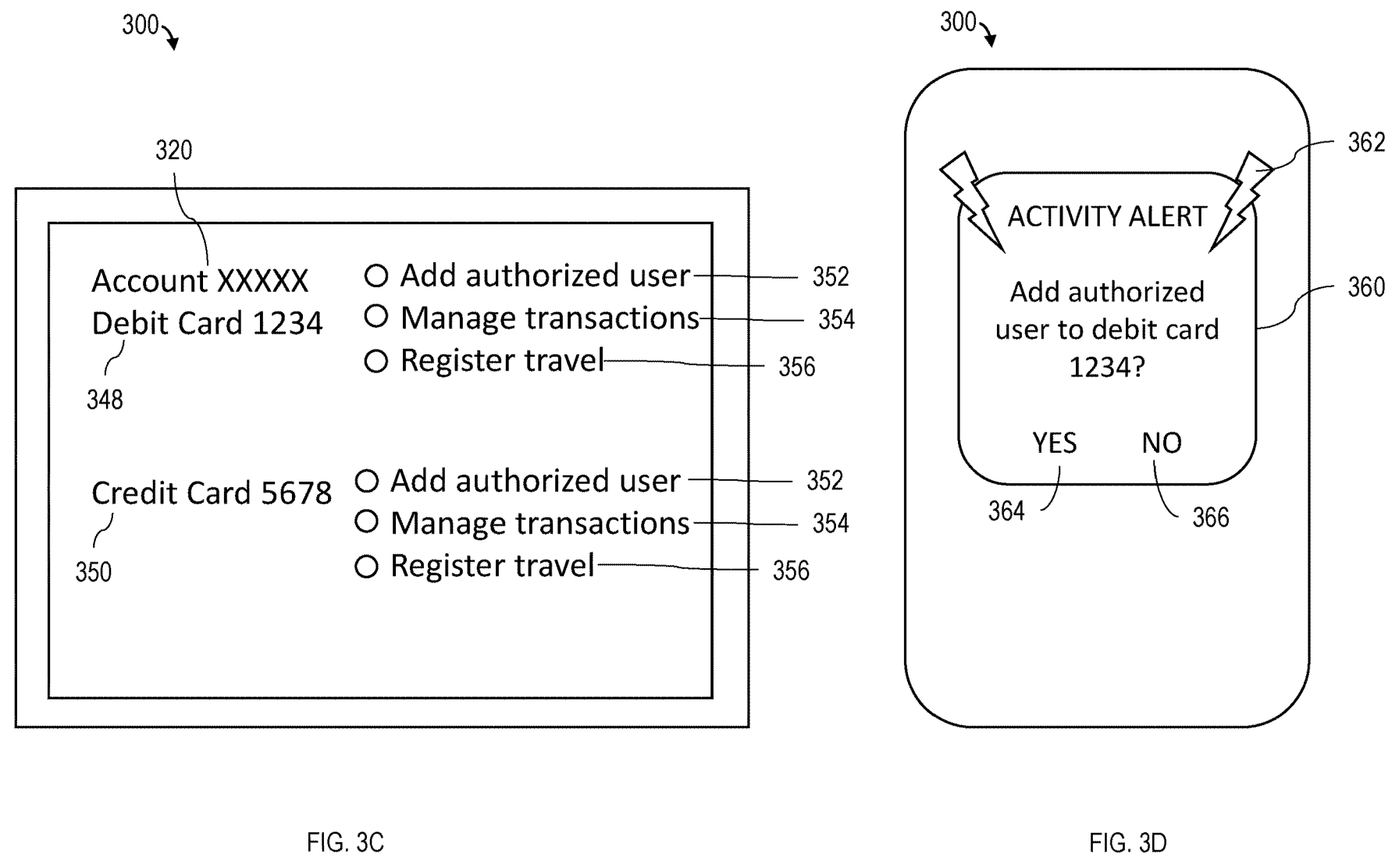

ACTIVITY ALERT

Add authorized
user to debit card
1234?

YES     NO

Account XXXXX
Debit Card 1234

348

○ Add authorized user    352
○ Manage transactions    354
○ Register travel    356

Credit Card 5678

350

○ Add authorized user    352
○ Manage transactions    354
○ Register travel    356

FIG. 3C

SYSTEMS AND METHODS FOR GENERATING, PROVIDING, AND MANAGING CUSTOM NOTIFICATIONS

TECHNICAL FIELD

The present disclosure relates to systems, computer-readable media, and methods for generating, providing, and managing custom notifications for various account activities.

BACKGROUND

Many entities and institutions employ notifications to alert pertinent users or customers of occurrences, such as weather notifications, sports notifications, financial account notifications, and so on. Referring to financial institutions in particular, these entities may employ various notification methods for notifying a customer of account activity. Conventionally, financial institutions may apply a same set of notification settings regardless of the type of activity performed. However, certain activities, such as potentially fraudulent activities, may require more prompt attention of a customer than other activities. Technically, many systems that are pertinent to the notification(s) are not communicatively linked to the system providing the notification. This results in latencies in the customer/user receiving the pertinent notification. Moreover, the communicative coupling is technically cumbersome. Therefore, to increase personalization, reduce latencies, and reduce the potential for fraudulent activity, customers may desire computerized systems and methods to provide and manage tailored and custom notifications for various activities.

SUMMARY

At least one arrangement relates to a computing system of a provider institution, the computing system comprising: a network interface; a database structured to store notification settings of a plurality of accounts of the provider institution; and at least one processing circuit comprising at least one processor and at least one memory, the at least one memory structured to store instructions that are executable to cause the at least one processor to: receive, via the network interface, from a first device coupled to the computing system, a request to perform an activity associated with an account of the plurality of accounts; determine, based on the activity, a notification policy based on at least one notification setting of the account associated with a user; transmit, via the network interface, a request for information regarding the activity to the first device; receive, via the network interface, information regarding the activity from the first device based on the request; generate a data payload comprising the received information regarding the activity and initial information associated with the request to perform the activity; retrieve an address associated with the account associated with the user; and provide, via the network interface, a notification comprising information from the data payload to a second device associated with the user based on the retrieved address, the notification causing the second device to render haptic feedback and visual feedback.

At least one arrangement relates to a computer-implemented method, comprising: receiving, by a computing system associated with a provider institution, from a first device coupled to the computing system, a request to perform an activity associated with an account of a plurality of accounts held by the provider institution; determining, by the computing system, based on the activity, a notification policy based on at least one notification setting of the account associated with a user stored in a database of the computing system; transmitting, by the computing system, a request for information regarding the activity to the first device; receiving, by the computing system, information regarding the activity from the first device based on the request; generating, by the computing system, a data payload comprising the received information regarding the activity and initial information associated with the request to perform the activity; retrieving, by the computing system, an address associated with the account of the user; and providing, by the computing system, a notification comprising information from the data payload to a second device associated with the user based on the retrieved address, the notification causing the second device to provide at least one of haptic feedback or visual feedback associated with the notification.

At least one arrangement relates to a non-transitory computer readable medium storing instructions that, when executed by at least one processor, cause operations comprising: receiving, via a network interface, from a first device, a request to perform an activity associated with an account of a plurality of accounts held by a provider institution; determining, based on the activity, a notification policy based on a notification setting of the account of a user; transmitting, via the network interface, a request for information regarding the activity to the first device; receiving, via the network interface, information regarding the activity from the first device based on the request; generating a data payload comprising the received information regarding the activity and initial information associated with the request to perform the activity; retrieving an address associated with the account of the user; and providing, via the network interface, a notification comprising information from the data payload to a second device associated with the user associated with the account based on the retrieved address, the notification causing the second device to provide haptic feedback and visual feedback.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIGS. 2A and 2B are flow diagrams of methods of generating, providing, and managing custom notifications for various account activities, according to example embodiments.

FIGS. 3A-3J are example interfaces presented to a user during a custom notification process.

DETAILED DESCRIPTION

Figure 1:
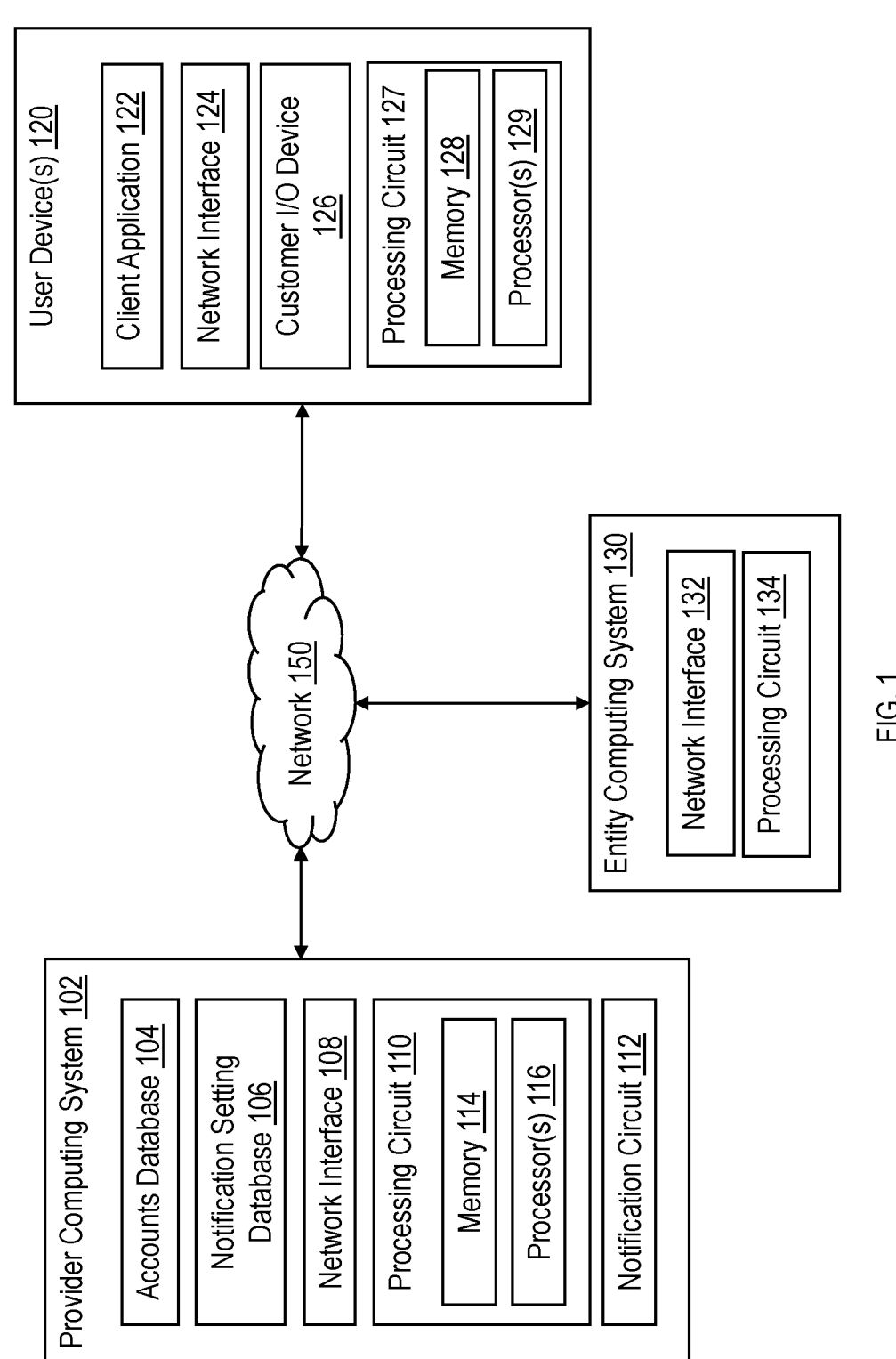
FIG. 1 is a block diagram of a system for generating, providing, and managing custom notifications for various account activities, according to an example embodiment.

Referring generally to the Figures, systems, computer-readable media, and methods for generating, providing, and managing custom notifications for various account activities are disclosed herein according to various embodiments. In some instances, the systems, computer-readable media, and methods described herein allow for a user of a provider institution to enroll in a custom notification service provided by a provider computing system by receiving various inputs from a device of the user defining one or more parameters of the custom notifications. The systems, computer-readable media, and methods described herein may store the defined parameters of the custom notifications in a database associated with a specific activity performed by the user (e.g., making transactions, managing accounts such as adjusting spending limits, enrolling with third-party mobile wallet applications, etc.). In operation, the systems, computer-readable media, and methods described herein may receive a request to perform an activity. The systems, computer-readable media, and methods described herein may automatically pull the stored notification settings associated with the requested activity to determine a notification policy to implement. The systems, computer-readable media, and methods described herein may transmit a notification to a device associated with the user in accordance with the implemented notification policy. In some instances, the systems, computer-readable media, and methods described herein may query an entity computing system (e.g., a merchant computing system) for contextual information regarding the requested activity to provide the contextual information to the user in the notification thereby transforming the notification into a non-conventional, more information-rich notification.

As a specific example, the activity request may include a request to make a transaction at a merchant. The systems and methods described herein may exchange data with the merchant to determine information regarding the transaction to provide the information to the user. For example, the transaction at the merchant may include a purchase of a product, such as a television. The systems and methods described herein may exchange data with the merchant to obtain supplementary information regarding the transaction at the merchant including, but not limited to, a custom message regarding the purchase (e.g., "Enjoy your new T.V.!"), a product identifier, an image of the product, a link to a digital receipt of the transaction, or various other information. The systems and methods described herein may provide the received supplementary information to a user device associated with the user as part of a custom notification process.

Technically and beneficially, the systems, computer-readable media, and methods described herein may automatically implement a notification policy based on at least one of a plurality of predetermined and stored settings set by a user for various different types of account activities. Additionally, the systems, computer-readable media, and methods described herein may automatically request additional activity information from a third-party computing system (e.g., a merchant computing system) to be transmitted with the notification. In this regard, the systems, computer-readable media, and methods described herein provide non-conventional operations for generating a data payload comprising information from the user account, information from a third-party (e.g., a merchant), and/or dynamic contextual information regarding the activity to generate a notification that may comprise relatively more information than typical notifications and, beneficially, enable relatively more operations from within the notification. In this way, a user may not have to visit third-party computing systems (e.g., website associated therewith, etc.) to implement various actions but, instead, can implement such actions directly from the notification thereby saving bandwidth and reducing the overall number of clicks/interactions of the user. For example, and as described herein, a requested account activity may comprise an adjustment to a transaction limit (e.g., a spending limit). The systems, computer-readable media, and methods may access an account of the user to query other associated cards of the user and generate a notification. The notification may comprise visual and/or haptic feedback provided to the user device of the user with a request to implement the adjusted transaction limits to the identified additional cards. The user may then provide an input on the notification (e.g., a swipe of the notification, a click of the notification, a button push of the user device, a shake of the user device) to accept the suggestion provided in the notification. In response, the acceptance is transmitted from the user device to the provider institution computing system that then implements the adjusted transaction limit with the other identified cards. In turn, the user need not make a special visit to an account settings page for the other accounts to implement similar transaction limits with the other accounts thereby saving computing resources, reducing the numbers of clicks, and improving an overall user experience.

Additionally, and as described herein, such technical improvements are necessarily rooted in computer-based technology. In particular, the technical improvements are necessarily rooted in the systems and networks required to process and provide notifications for various account activities, such as financial account activities. The systems, computer-readable media, and methods described herein provide non-conventional solutions to technical problems. For example, the systems, computer-readable media, and methods operate in a non-conventional way by implementing specific notification policies for various different types of activities and automatically requesting supplemental information or content specific to an activity from a third-party device/system, such as merchant device or system. In contrast, systems conventionally may only implement the same set of notification settings across different types of activities. Further, systems conventionally do not provide supplemental information from a merchant in notifications and instead require a user to manually search for such information. Such customization and supplemental information can increase the efficiency and effectiveness of the notifications, messages, and the like by allowing a user to prioritize notifications based on the type of activity and reduce processing power of a user device. Furthermore, the systems, computer-readable media, and methods described herein may facilitate reducing potentially fraudulent activity by allowing a user to prioritize notifications for fraudulent activity over other types of activities. Various other technical benefits and advantages are described in greater detail below.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a diagram of a computing environment 100 for generating, providing, and managing custom notifications in response to for various activities, according to an example embodiment. As shown, the computing environment 100 includes one or more provider computing systems 102 associated with a provider (e.g., a financial institution), one or more user devices 120 associated with one or more users, and/or one or more entity computing systems 130 associated with third-parties relative to the provider institution. The provider computing system(s) 102, the user device(s) 120, and/or the entity computing system(s) 130 are communicably coupled by a network 150, which may include one or more of the Internet, cellular network, Wi-Fi, Wi-Max, a proprietary banking network, or any other type of wired or wireless network or a combination of wired and wireless networks. As described herein, the computing environment 100 may enable generating, providing, and managing custom notifications for various account activities.

For clarity, the following description will refer to a provider computing system 102 and an entity computing system 130. However, it will be understood that the following description of any of these devices and computing systems will be similarly applicable to any additional corresponding devices and computing systems (e.g., additional provider computing systems 102 and/or entity computing systems 130) and that, in some embodiments, the computing environment 100 may include a plurality of any of the described devices and systems.

The provider computing system 102 is owned by, associated with, or otherwise operated by a provider institution (e.g., a bank or other financial institution) that maintains one or more accounts held by various customers (e.g., the customer associated with the user device 120), such as demand deposit accounts, credit card accounts, receivables accounts, and so on. In some instances, the provider computing system 102, for example, may include one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the provider computing system 102 may be or may include various other devices communicably coupled thereto, such as, for example, desktop or laptop computers (e.g., tablet computers), smartphones, wearable devices (e.g., smartwatches), and/or other suitable devices.

In some embodiments, the provider computing system 102 includes an accounts database 104, a notification settings database 106, a network interface 108, and at least one processing circuit 110 having at least one memory 114 and one or more processors 116. The provider computing system 102 may include at least one notification circuit 112. In some instances, the network interface 108 includes, for example, hardware and/or program logic that connects the provider computing system 102 to the network 150. The network interface 108 facilitates secure communications between the provider computing system 102 and each of the user device(s) 120 and entity computing system(s) 130. The network interface 108 also facilitates communication with other entities, such as other banks, settlement systems, and so on. The network interface 108 further includes user interface program logic configured to generate and present web pages to users accessing the provider computing system 102 over the network 150.

The accounts database 104 is structured or configured to retrievably store account and/or user information of an account of a user associated with the one or more user devices 120. In some instances, the account information may include a name, a phone number, an e-mail address, a physical address, account information (e.g., one or more account numbers), credit card accounts, credit limits, etc. of the user associated with the one or more user devices 120. The notification settings database 106 is structured or configured to retrievably store notification information based on a plurality of inputs received from the user device 120 to set a notification policy, as described in greater detail herein. The notification circuit 112 is structured or configured to perform a variety of functionalities or operations to provide and manage notifications corresponding to various customer activities (e.g., managing and/or performing transactions, managing credit accounts, adding or removing authorized users, registering traveling, provisioning accounts to third-party mobile wallet client applications, etc.) in connection with account data stored within the account database 104. The notification circuit 112 may be configured to receive a plurality of inputs defining a custom notification policy for one or more various customer activities. The notification circuit 112 may be configured to store the defined custom notification policy in the notification settings database 106 to implement the notification policy based on customer account activity. For example, the notification circuit 112 may be configured to monitor and/or pull data from the accounts database 104 corresponding to one or more customer/account activities associated with the user device 120. The notification circuit 112 may be structured or configured to determine, based on at least one notification setting stored in the notification settings database 106, a notification policy for the one or more customer/account activities, transmit one or more notifications to a user device based on the notification policy, and/or a variety of other services associated with and/or provided by the financial institution, as described in greater detail with reference to FIGS. 2A-3J.

The user device 120 is owned, operated, controlled, managed, and/or otherwise associated with a customer (e.g., a customer of the provider institution). In some embodiments, the user device 120 may be or may include, for example, a desktop or laptop computer (e.g., a tablet computer), a smartphone or other mobile computing device, a wearable device (e.g., a smartwatch), a personal digital assistant, and/or any other suitable computing device. In the example shown, the user device 120 is a user mobile device, shown as a smartphone.

In some embodiments, the user device 120 includes one or more I/O devices 126, a network interface 124, and one or more client applications 122. While the term "I/O" is used, it should be understood that the I/O devices 126 may be input-only devices, output-only devices, and/or a combination of input and output devices. In some instances, the I/O devices 126 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 126 further include one or more user interfaces (devices or components that interface with the customer), which may include one or more biometric sensors (such as a fingerprint reader, a heart monitor that detects cardiovascular signals, face scanner, an iris scanner, etc.).

The network interface 124 includes, for example, hardware and/or program logic and various devices (e.g., transceivers, etc.) that couple the user device 120 to the network 150. For example, the network interface 124 may include a combination of one or more wireless network transceivers (e.g., a cellular modem, an NFC transceiver, a Bluetooth transceiver, a Wi-Fi transceiver, etc.) and/or a wired network transceiver (e.g., an Ethernet transceiver). The network interface 124 facilitates secure communications between the user device 120 and each of the provider computing system 102 and/or the entity computing system 130. The network interface 124 also facilitates communication with other entities, such as other banks, settlement systems, and so on.

The user device 120 includes at least one processing circuit 127 having at least one memory 128 and at least one processor 129. The user device 120 stores in computer memory 128, and executes ("runs") using one or more processors 129, various client applications 122, such as an Internet browser presenting websites, text messaging applications (e.g., for sending MMS or SMS to the provider computing system 102 and/or the entity computing system 130), and/or applications provided or authorized by entities implementing or administering any of the computing systems in computing environment 100.

For example, in some instances, the client applications 122 include a provider institution client application (e.g., a financial institution banking application) provided by and at least partly supported by the provider computing system 102. For example, in some instances, the client application 122 coupled to the provider computing system 102 may enable the customer to perform various customer activities (e.g., notification policy/setting management, account management, payload generation, authorized user management, etc.) and/or perform various transactions (e.g., transferring money between one or more accounts, paying various bills, etc.) associated with one or more customer accounts of the customer held at the provider associated with the provider computing system 102 (e.g., account opening and closing operations, fund transfers, etc.). In some instances, the client application 122 provided by the provider computing system 102 may additionally be coupled to the entity computing system 130 (e.g., via one or more application programming interfaces (APIs) and/or software development kits (SDKs)) to integrate one or more features or services provided by the entity computing system 130.

The entity computing system 130 is controlled by, managed by, owned by, and/or otherwise associated with an entity (e.g., a merchant, a retailer, etc.) that is configured to transmit information to the provider computing system 102. In particular, the entity computing system 130 is associated with a third-party relative to the provider institution, such as a merchant, a card issuer (e.g., Visa®, etc.), etc. Although not specifically shown and in addition to a network interface 132, the entity computing system 130 may include various databases (e.g., similar to the accounts database 104) and at least one processing circuit 134 having one or more processor(s) in the same or similar manner to the other components of computing environment 100. In one particular embodiment, the entity may be one or more merchants, retailers, venues, or other organizations capable of initiating a transaction (e.g., credit card transactions, debit card transactions, mobile wallet transactions, etc.). Thus, it should be appreciated that while only one entity is depicted, the system may include a plurality of entities representing a plurality of third parties. In other embodiments, the entity may be a different entity associated with implementing account activities of the users of the provider institution, such as card issuers, mobile wallet application providers, and so on.

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 2B:
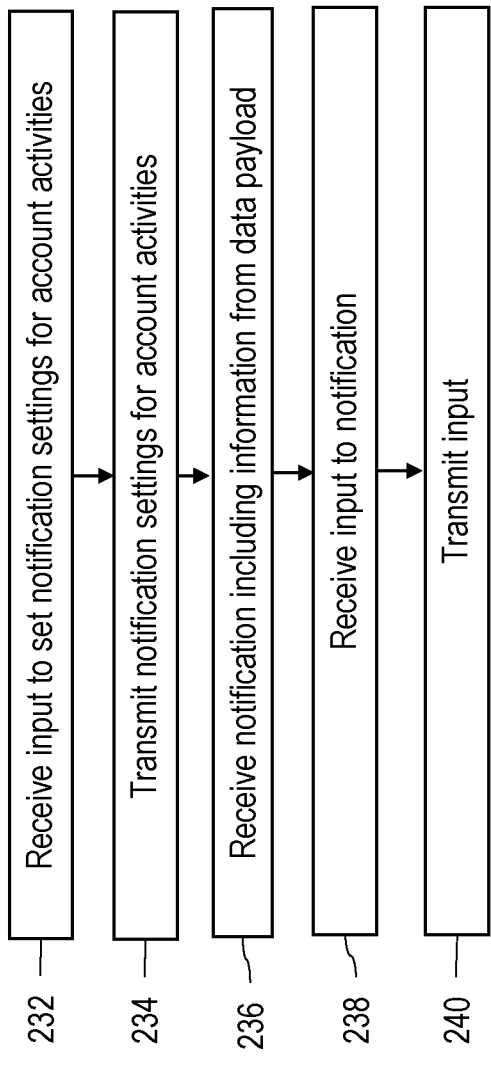

Referring now to FIG. 2A, a flow diagram of a method 200 for generating, providing, and managing custom notifications for various account activities via the provider computing system 102 is shown, according to an example embodiment. FIG. 2B depicts a method 250 for generating, providing, and managing custom notifications for various account activities via the user device 120, according to an example embodiment. Various operations of the methods 200, 250 may be conducted by the computing environment 100 and particularly parts thereof (e.g., the provider computing system 102, the user device 120, and/or the entity computing system 130). For example, FIG. 2A depicts a method 200 conducted by the provider computing system 102 and FIG. 2B depicts a method 250 conducted by the user device 120.

As a brief overview of the method 200 shown in FIG. 2A, at process 202, the provider computing system 102 (e.g., the notification circuit 112) receives a request to set at least one notification setting for one or more account activities. At process 204, the notification circuit 112 stores the notification settings. At process 206, the notification circuit 112 receives a request to perform an activity of an account from a first device. In this example, the first device refers to the entity computing system 130. At process 208, the notification circuit 112 determines a notification policy based on the received request. At process 210, the notification circuit 112 transmits a request for information regarding the requested activity to the first device. At process 212, the notification circuit 112 receives information regarding the activity from the first device. At process 214, the notification circuit 112 generates a data payload including initial information regarding the activity request and the received information from the first device. At process 216, the notification circuit 112 retrieves an address associated with the account. At process 218, the notification circuit 112 provides a notification including the information from the data payload to a second device (e.g., the user device 120) associated with the address. At process 220, the notification circuit 112 determines if the provider computing system 102 receives an approval. If the notification circuit 112 determines that an approval was not received, the notification circuit 112 may return to process 206. If the notification circuit 112 determines that an approval was received, the notification circuit 112 proceeds to process 222 and approves the request to perform the activity.

As a brief overview of the method 250 shown in FIG. 2B, at process 232, the user device 120 (e.g., the processing circuit 127 via the client application 122) receives a manual input to set notification settings for one or more activities. At process 234, the processing circuit 127 transmits the notification settings to the provider computing system 102. At process 236, the processing circuit 127 receives a notification from the provider computing system 102 including information from the data payload. At process 238, the processing circuit 127 receives a manual input to the notification. At process 240, the processing circuit 127 transmits the manual input to the provider computing system 102.

Figure 3B:
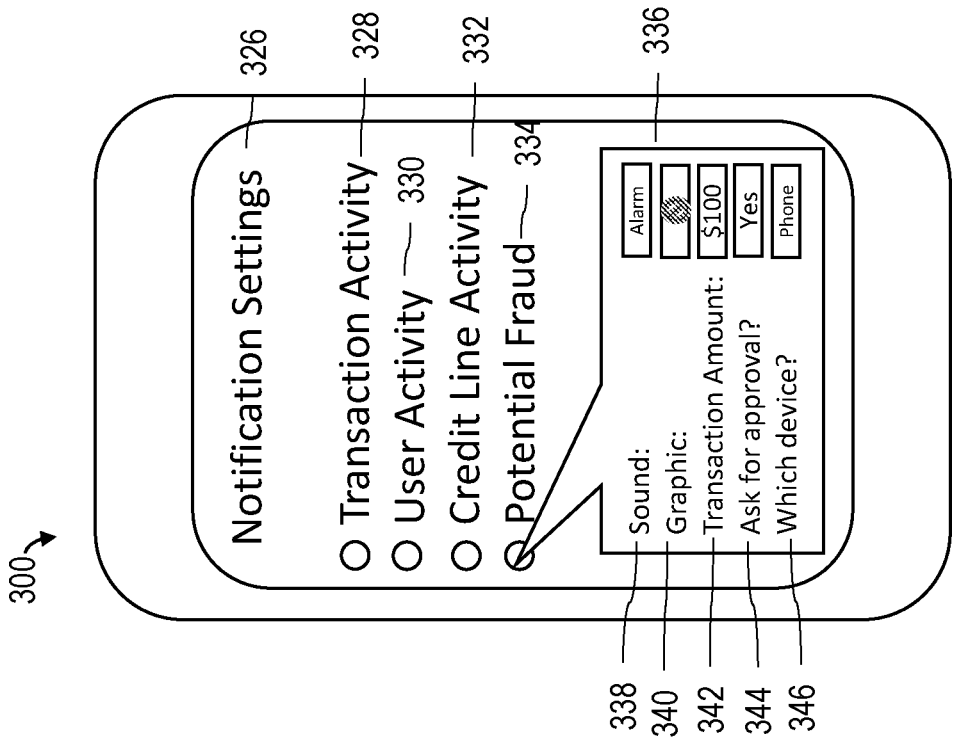
Figure 3A:
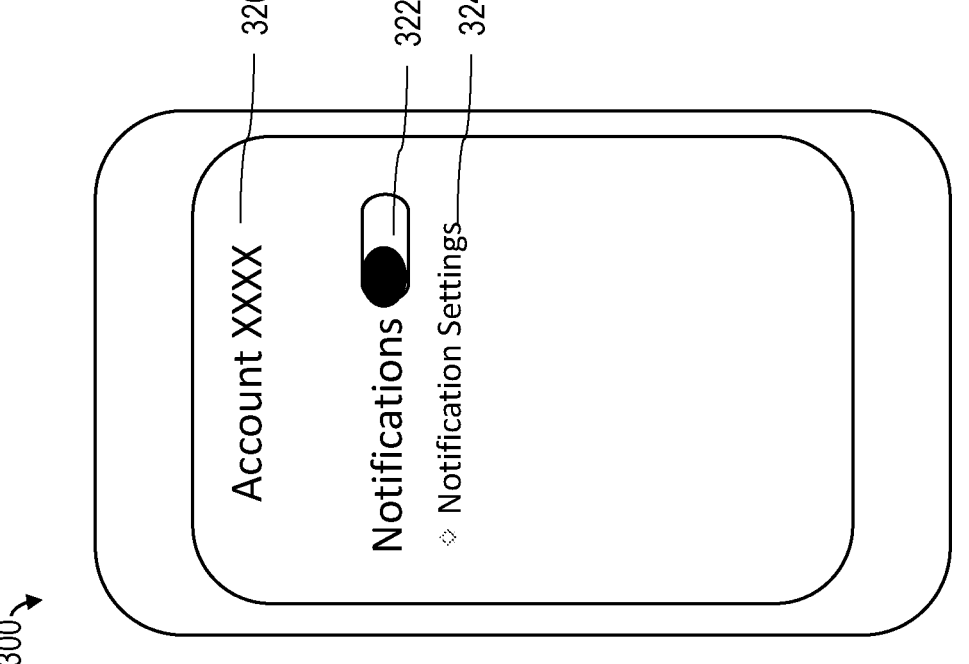

The provider computing system 102 (e.g., the notification circuit 112) and/or the user device 120 may be configured to initiate one or more processes of the method 200 an/or the method 250 responsive to receiving an input from a user device 120 indicating a user wishes to enroll in a notification service for receiving notifications associated with various account activities. Additionally, or alternatively, the notification circuit 112 and/or the user device 120 may be configured to receive a request to enroll in a notification service responsive to receiving a transaction request from an entity computing system 130, as described herein. For example, the user device 120 (e.g., the processing circuit 127) may be configured to receive a manual input to a display of the user device 120 (e.g., via a user interface generated and provided by the provider institution client application 122). For example, the notification circuit 112 and/or the processing circuit 127 may be configured to generate and provide a user interface 300 to the user device 120, as shown in FIG. 3A. The user interface 300 may include one or more indications of an account 320 (e.g., account number, user name, account name, etc.) associated with a customer (e.g., the customer associated with the user device 120). For example, the notification circuit 112 and/or the processing circuit 127 may be configured to provide the user interface 300 responsive to receiving log-in credentials for a customer account (e.g., an account of the client application 122 associated with a user profile of the customer). The notification circuit 112 and/or the processing circuit 127 may be configured to authenticate a user based on the received log-in credentials and provide access to the user interface 300 based on the authentication. For example, the notification circuit 112 and/or the processing circuit 127 may be configured to navigate to and render the user interface 300 including a notification settings window based on the log-in credentials.

The user profile may include information regarding the customer including, but not limited to, an age, name, income, address, spending history, or other information stored in the user profile associated with the account or various other information. The user interface 300 may include a selectable feature 322 that allows the customer to enroll into a notification service for one or more account activities. As exemplified herein, the account activities may include, but are not limited to, making a transaction, paying a credit card bill, adding or removing an authorized user, adding or removing an account, making a withdrawal or deposit, transferring funds between multiple accounts, adding an account to a digital mobile wallet, updating credit and/or spending limits, ordering a replacement card, reporting a lost or stolen card, and/or various other activities and, particular card account activities. Responsive to receiving an input to the selectable feature 322, the notification circuit 112 may be configured to enroll the customer in the notification service.

At process 232, the user device 120 (e.g., via the client application 122) receives a request to set notification settings for one or more activities. For example, after enrolling the customer in the notification service, the client application 122 may be configured to receive a manual input to a display of the user device 120 to set one or more notification settings for the notification service responsive to receiving an input to the notification settings selectable feature 324 of the user interface 300. Responsive to receiving the input to the notification settings selectable feature 324 of the user interface 300, the notification circuit 112 and/or the client application 122 may be configured to generate and provide a second and/or updated user interface 300 to the user device 120, as depicted in FIG. 3B, to define parameters of one or more notification policies of the notification service. For example, a "notification setting" or "notification policy" may define a process and/or structure of how and when various notifications, if any, are provided to and/or rendered on a user device 120 based on particular account activities. Each account activity, described herein, can include a corresponding one or more notification settings defined by a user of the user device 120. The user device 120 and/or the provider computing system 102 may be configured to provide notifications to the user device 120 based on the defined notification settings, as described herein. It should be understood that while a plurality of user interfaces are described herein, the user interfaces may be displayed simultaneously and/or be updated on one or more displays of the user device 120. As shown in the FIG. 3B, the user interface 300 may include a notification settings list 326. The notification settings list 326 may include a plurality of selectable features to define one or more custom notification settings for one or more of a plurality of various types of activities (e.g., such that one or more activities may have an independent notification policy).

The notification settings list 326 may include a plurality of selectable activities for a user to select and apply various preferences. The notification settings list 326 may include a plurality of selectable features each associated with a distinct activity (e.g., a transaction made using a specific payment method, a transaction made about a specific amount, etc.), and/or the notification settings list 326 may include one or more categories of activities (e.g., transactions, user activity, etc.) that are associated with a plurality of activities within the category. For example, the notification settings list 326 may include a transaction activity selectable feature 328 (e.g., corresponding to any transactions made using one or more cards or accounts associated with the user device 120), a user activity selectable feature 330 (e.g., corresponding to adding or removing an authorized user, adding or removing an account, updating user information, etc.), a credit line activity selectable feature 332 (e.g., corresponding to paying a credit card bill, changing a spending limit, adding or removing a card, etc.), and/or a potential fraudulent activity selectable feature 334 (e.g., corresponding to any potential fraudulent activity). It should be understood that the selectable activities described herein are illustrative. The user interface 300 may include additional and/or alternative selectable activities.

Responsive to receiving an input to the transaction activity selectable feature 328, the user activity selectable feature 330, the credit line activity selectable feature 332, and/or the potential fraud selectable feature 334, the notification circuit 112 may be configured to generate and render a pop-up box 336 and/or another user interface 300 including one or more inputs to customize the selected activity. For example, the pop-up box 336 may include a sound input 338, a graphic input 340, a transaction amount input 342, an approval input 344, and/or a device input 346. The inputs may include any one or more of a drop-down menu, a dialogue box, or a selectable feature to select one or more parameters associated with the input. For example, responsive to receiving an input to a drop-down menu of the sound input 338, the notification circuit 112 may be configured to render a plurality of sound and/or haptic feedback options for a notification of the selected activity including, but not limited to, vibrate, ring tones, music tones, and/or other sounds. As another example, responsive to receiving an input to a drop-down menu of the graphic input 340, the notification circuit 112 may be configured to generate and provide a plurality of image, icon, and/or video options for a notification of the selected activity including, but not limited to, images of various products (e.g., radios, computers, phones, food items, clothing items, etc.), videos of various products, graphics and/or icons, various types of colors or positive and negative reinforcement (e.g., green for good activities, red for fraudulent activities, etc.), and/or various additional or alternative graphic options. In some implementations, the notification settings database 106 may be configured to store a predetermined amount of input options (e.g., sound and/or haptic feedback options, graphic/visual options, etc.) that the provider computing system 102 is configured to generate and provide. At process 234, the client application 122, via the processing circuit 127 and network interface, may be configured to transmit the notification settings to the provider computing system 102.

At process 202, the notification circuit 112 may be configured to receive the notification settings from the user device 120. At process 204, the notification circuit 112 may be configured to store the selected notification settings. For example, responsive to receiving a selection of the one or more sound input 338 options, the notification circuit 112 may be configured to store the selected sound in the notification settings database 106. As an illustrative example, the notification circuit 112 may be configured to receive an input indicating to include an alarm sound with a notification transmitted based on potential fraudulent activity. Responsive to receiving a selection of the one or more graphic input 340 options, the notification circuit 112 may be configured to store the selected graphic in the notification settings database 106. As an illustrative example, the notification circuit 112 may be configured to receive an input indicating to include a warning icon displayed with a notification transmitted based on potential fraudulent activity. Responsive to receiving an input to a dialogue box of the transaction amount input 342, the notification circuit 112 may be configured to store the inputted numerical amount in the notification settings database 106. As an illustrative example, the notification circuit 112 may be configured to receive an input indicating to transmit a notification responsive to detecting any fraudulent activity that exceeds a predefined transaction amount (e.g., $100). Responsive to receiving an input to a selectable feature of the approval input 344, the notification circuit 112 may be configured to store the selected feature in the notification settings database 106. As an illustrative example, the notification circuit 112 may be configured to receive an indication to include a selectable feature transmitted with the notification responsive to detecting any fraudulent activity to approve and/or deny the potentially fraudulent transaction. Responsive to receiving an input to the device input 346, the notification circuit 112 may be configured to receive an indication to transmit the notification to a specific user device 120 (e.g., if an account is associated with multiple devices such as a mobile device, a laptop, a smartwatch, etc.). As an illustrative example, the notification circuit 112 may be configured to receive an indication to transmit any notifications to a mobile device associated with the customer, even if the activity is not associated with the mobile device (e.g., a mobile wallet transaction from a first device and a notification is sent to a second, different device). In some implementations, the notification circuit 112 may be configured to store each of the selected notification settings with the respective category of activities and/or with the respective activity.

In some implementations, the user interface 300 may include an "apply all" selectable feature. Responsive to receiving an input to the apply all feature, the notification circuit 112 may be configured to store the selected notification setting inputs for all activities. In some implementations, the notification circuit 112 may be configured to receive and store independent notification setting inputs for each of the one or more selectable activities. In other words, the notification circuit 112 may be configured to receive and apply different notification settings (e.g., sound preferences, visual preferences, amount preferences, and/or approval preferences) for various different activities. In some implementations, the notification circuit 112 may be configured to store the one or more different notification settings responsive to receiving an input to an apply and/or save selectable feature.

At process 206, the provider computing system 102 (e.g., the notification circuit 112) may be configured to receive a request to perform an activity of an account from a first device (e.g., the entity computing system 130 or the user device 120). In some implementations, the notification circuit 112 may be configured to receive a request to perform a transaction. For example, the notification circuit 112 may be configured to receive a transaction request from a point-of-sale (POS) device of or associated with an entity computing system 130 (e.g., a merchant, retailer, online, etc.) and/or from the user device 120 (e.g., using a mobile wallet application). The notification circuit 112 may be configured to identify an account associated with the activity based on information from the entity computing system 130. For example, the notification circuit 112 may be configured to receive a card number or portion thereof from the entity computing system 130 via a payment rail (e.g., real-time transport protocol (RTP), credit card, etc.).

In some implementations, the notification circuit 112 may utilize an NFC protocol to initiate pairing and to communicate (e.g., transmit and receive) data payloads with a POS device associated with the entity computing system 130. The notification circuit 112 may be configured to provide encryption functionalities (e.g., the notification circuit 112 may encrypt and/or tokenize data payloads associated with a paired device). For example, the notification circuit 112 may encrypt and/or tokenize certain aspects, or all, of the data payload prior to a transmission of the data payload. The notification circuit 112 is configured to utilize a variety of technologies and/or communication protocols (e.g., Bluetooth, Wi-Fi, NFC, etc.). In one embodiment, the communication protocols are included with the user device 120 (e.g., a separate NFC chip) and the notification circuit 112 communicates and controls these devices. In another embodiment, the notification circuit 112 includes dedicated one or more communication chips thereby allowing relatively more secure communication means (e.g., includes a Bluetooth transceiver and/or NFC chip).

In some implementations, the notification circuit 112 may be configured to facilitate completing a mobile wallet transaction via an NFC protocol with a POS device associated with the entity computing system 130. For example, a transaction between the user device 120 (e.g., via the client application 122) and a POS device may be initiated via a short-range communication (e.g., NFC, Bluetooth, etc.) between the user device 120 and the POS device. The short-range wireless communication is NFC where the user device 120 "taps" the POS. Responsive to the initiation of the transaction, the POS device may be configured to receive address information of the user device 120 and/or other contextual information regarding the initiated transaction (e.g., a transaction amount, a location of the transaction, a time of transaction, etc.). The POS device may be configured to transmit the transaction information to the provider computing system 102. The notification circuit 112 may be configured to use the NFC information to obtain account activity information associated with the transaction. The notification circuit 112 may be configured to use the NFC data as part of a payload generation, as described in greater detail herein.

In some implementations, the notification circuit 112 may be configured to receive a request to manage one or more credit lines and/or spending limits of one or more accounts associated with a user of a user device 120. For example, the notification circuit 112 may be configured to receive at least one input to a user interface of the user device 120 indicating the user wishes to update a spending limit (e.g., by receiving an input to a selectable feature). In some implementations, the notification circuit 112 may be configured to receive a request to add or remove one or more authorized users on an account. For example, the notification circuit 112 may be configured to receive at least one input to a user interface of the user device 120 indicating the user wishes to add or remove an authorized user (e.g., by receiving an input to a selectable feature). In some implementations, the notification circuit 112 may be configured to receive a request to activate, deactivate, and/or replace one or more payment methods and, particular, transaction cards (e.g., a debit card, a credit card, etc.). For example, the notification circuit 112 may be configured to receive at least one input to a user interface of the user device 120 indicating the user wishes to deactivate a credit card, activate a new card, activate/ provision or remove/de-provision a card for a mobile wallet, and/or replace or update a method of payment (e.g., by receiving at least one input to a selectable feature). In some implementations, the notification circuit 112 may be configured to receive a request to register travel. For example, the notification circuit 112 may be configured to receive at least one input to a user interface of the user device 120 indicating the user wishes to register a planned trip (e.g., by receiving at least one input to a selectable feature). Responsive to receiving the input to register travel, the notification circuit 112 may be configured to receive information associated with a payment card to be used during the travel, the dates and/or locations of travel, and various other information. The notification circuit 112 may be configured to approve or allow transactions using the registered payment card at the registered location within the determined dates. These examples are illustrative and non-exhaustive. The notification circuit 112 may be configured to receive one or more of a plurality of additional or alternative requests to perform various other account activities.

The notification circuit 112 may be configured to receive various initial information of the requested activity from the first device (e.g., the entity computing system 130 or the user device 120). The "initial information" refers to information, data, etc. associated with the requested activity. For example, the initial information may include, but is not limited to, a date, time, or location of the activity, an amount of the activity (e.g., transaction), a merchant ID associated with the activity (e.g., an ID, such as a numeric, alpha, or alphanumeric value associated with the entity computing system 130), a product ID number (e.g., for a transaction), a barcode associated with the activity (e.g., transaction), another type of identifier of the activity, and/or various additional information associated with the activity.

At process 208, the notification circuit 112 may be configured to determine a notification policy of the requested activity based on the stored notification settings. For example, the notification circuit 112 may be configured to pull notification settings associated with the requested activity from the notification settings database 106. By way of example, the notification circuit 112 may be configured to extract stored notification settings for making a transaction based on settings selected by a user specific to transaction activity, as shown and described with reference to FIG. 3B. The notification circuit 112 may be configured to implement one or more notification policies based on the stored notification settings. In some implementations, as part of implementing the notification policy, the notification circuit 112 may be configured to determine a receiving device identifier for transmitting the notification.

At process 210, the notification circuit 112 may be configured to transmit a request for supplemental information regarding the requested activity to the first device (e.g., the entity computing system 130 or the user device 120) using address information of the first device (e.g., an IP address, a network address, etc.). For example, and when the request is a transaction request from a merchant, the provider computing system 102 (e.g., the notification circuit 112) may be configured to exchange data with one or more entity computing systems 130 to determine supplemental information associated with a transaction request. For example, responsive to receiving a transaction request, the notification circuit 112 may be configured to transmit a request to the entity computing system 130 to obtain various supplemental information associated with the transaction. In some implementations, the provider computing system 102 may be configured to establish an API link with the entity computing system 130 by transmitting one or more API calls for information associated with the transaction to the entity computing system 130. The supplemental information may be or may include additional information relative to the initial information received with the transaction request and may include, but is not limited to, product information such as a product ID, a barcode associated with a transaction, a merchant ID, a customized messaged from the merchant, specific purchase information, such as a product name, image, or type, or other information. The supplemental information may include, for example, information that may be referenced as part of the initial transaction request information, but not necessarily included in the received initial transaction request information.

In some implementations, the notification circuit 112 may be configured to receive a digital receipt associated with the transaction request from the entity computing system 130 and/or an image associated with a product linked to the product ID. In some implementations, the notification circuit 112 may be configured to request supplemental content in additional to supplemental information associated with the activity. For example, the notification circuit 112 may be configured to exchange information with the entity computing system 130 and/or use artificial intelligence (AI) to determine similar products purchased by similarly situated users (e.g., based on a user's known income, age, location, spending history, or other information stored in the user profile associated with the account). The product may be determined based on the product identifier. For example, in some implementations, the provider computing system 102 may be configured to transmit a request for supplemental content to the entity computing system 130, in which the request may include an identifier associated with the transaction and a request for similar products other users have historically purchased based on the product purchased in the transaction. The provider computing system 102 may include a predefined list of similar products to determine similar products. Based on the AI determination, the notification circuit 112 may be configured to generate supplemental content including advertisements of identified similar purchases and/or financial advice (e.g., indicating what other users have invested in based on the purchased product or identified similarly purchased products from other merchants or providers). In some implementations, the received supplemental content may include a URL to financial advisors, related products, or to other features of the entity computing system 130.

In some implementations, the supplemental information may include a list of previous transactions or other activities associated with the entity computing system 130. For example, the notification circuit 112 may be configured to receive a generated report of previous activities associated with the entity computing system 130 in the form of a data packet/payload that can be transmitted with the requested supplemental information. In some implementations, a user of the user device 120 may be configured to control what information is exchanged between the entity computing system 130 and the provider computing system 102. For example, the user device 120 may be configured to receive one or more inputs from the user indicating which information to exchange. The user device (e.g., via the client application 122) may be configured to generate and provide prompts to a user to approve or deny the exchange of information. For example, in instances in which the account activity includes online shopping via the user device 120, the user device 120 may be configured to generate and provide a prompt on the user device 120 asking if the user wishes to receive supplemental information regarding the purchase associated with the entity computing system 130. Responsive to receiving an input to the prompt, the notification circuit 112 may be configured to transmit the request to the entity computing system 130 for supplemental information.

At process 212, the notification circuit 112 may be configured to receive the requested supplemental information and/or content responsive to the request. In some implementations, the notification circuit 112 may be configured to receive additional or alternative information associated with the transaction request including, but not limited to, details regarding the goods and/or services exchanged in the transaction (e.g., a product name, product type, service name, service type, etc.) and/or details regarding the merchant associated with the entity computing system 130 (e.g., a merchant name, merchant type, merchant promotions such as upcoming discounts, sales, etc.). In some implementations, the provider computing system 102 may be configured to extract information of a transaction request using one or more context recognition algorithms (e.g., optical character recognition (OCR)) to extract text of a digital receipt received from the entity computing system 130.

At process 214, the notification circuit 112 may be configured to generate a data payload including the initial information regarding the requested activity and the supplemental information or content from the entity computing system 130. For example, the notification circuit 112 may be configured to package the initial information and the received supplemental information as a data payload to be provided to a second device (e.g., as a push notification), as described herein.

At process 216, the notification circuit 112 may be configured to retrieve an address associated with the account of the customer. The address may be associated with a second device (e.g., the user device 120). The address may include, but is not limited to, an IP address of the user device 120, a mobile device serial number of the user device 120, an ISIN of the user device 120, an ASIN of the user device, a combination thereof, etc. The address may be used to establish a communication link/channel with the user device 120. The notification circuit 112 may be configured to pull the address from the user profile. For example, the user profile may store the address of the user device 120 responsive to a customer logging into the client application 122 on the user device 120.

At process 218, the notification circuit 112 may be configured to provide a notification to the second device associated with the address (e.g., the user device 120). For example, the notification circuit 112 may be configured to transmit the notification specific to the notification policy generated for the corresponding activity request. At process 236, the user device 120 (e.g., the processing circuit 127 and client application 122) may be configured to receive the notification from the provider computing system 102. FIGS. 3C-3J depict various examples of user interfaces 300 of one or more user devices 120 displaying one or more transmitted notifications. As depicted in FIG. 3C, the notification circuit 112 may be configured to generate and provide a third user interface 300 responsive to, for example, receiving log-in credentials to a mobile client application 122, which may be embodied as a mobile banking application supported by the provider computing system. The user interface 300 may include various selectable features for a user to manage one or more accounts associated with the provider computing system 102. For example, the user interface 300 may include a first account identifier 348 associated with a first account (e.g., a debit account) and/or a second account identifier 350 associated with a second account (e.g., a credit account). The user interface 300 may include a plurality of selectable features associated with each account including, but not limited to, an authorized user selectable feature 352, a manage transactions selectable feature 354, and/or a register travel selectable feature 356. Responsive to receiving an input to one of the authorized user selectable features 352, the notification circuit 112 may be configured to receive a request to add or remove an authorized user for the respective account. Responsive to receiving an input to one of the manage transactions selectable features 354, the notification circuit 112 may be configured to receive a request to view a plurality of transactions associated with the respective account. Responsive to receiving an input to one of the register travel selectable features 356, the notification circuit 112 may be configured to receive a request to register a known upcoming trip to use a payment method associated with the respective account.

FIG. 3D depicts another (e.g., fourth) user interface 300. The notification circuit 112 may be configured to generate and provide the fourth user interface 300 to one or more user devices 120 responsive to receiving an input to one of more of the selectable features on the third user interface 300 shown in FIG. 3C. For example, the fourth user interface 300 may include at least one notification 360. The notification circuit 112 may be configured to transmit the notification 360 to the user device 120 responsive to receiving an input to the authorized user selectable feature 352 on the third user interface 300. The notification circuit 112 may be configured to transmit the notification 360 according to the determined notification policy for an input to the authorized user selectable feature 352. For example, the notification circuit 112 may be configured to transmit the notification 360 to a first user device 120 (e.g., a mobile phone) of a user, even if the input to the authorized user selectable feature 352 was received via a second user device 120 (e.g., a computer).

The notification 260 may include at least one haptic feature and/or at least one visual feature. For example, the notification 360 may include one or more sounds, vibrations, and/or other haptic feedback 362 as defined by the notification policy. The notification 360 may include one or more texts, images, or other visual features rendered on the user device 120. The notification 360 may include an indication of the activity requested and/or an account name or number associated with the activity. In some implementations, the notification 360 may include one or more selectable features to receive an approval of the requested activity. For example, the notification 360 may include an approval input 364 and/or a disapproval input 366. Responsive to receiving an input to the approval input 364, the notification circuit 112 may be configured to receive the approval of the request. Responsive to an input to the disapproval input 366, the notification circuit 112 may be configured to receive a disapproval of the request.

Figure 3F:
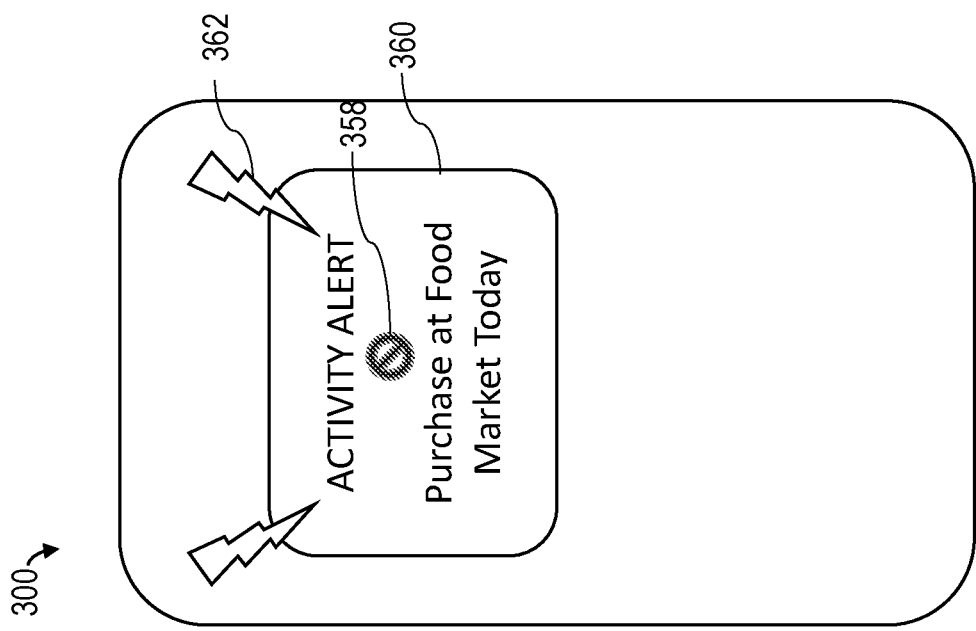
Figure 3E:
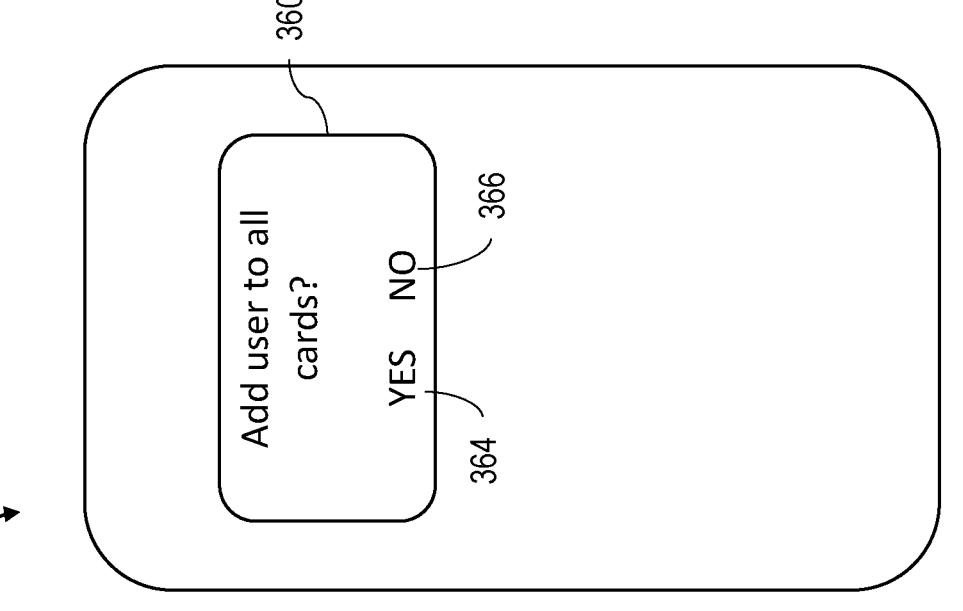

In some implementations, responsive to receiving an input to the approval input 364, the notification circuit 112 may be configured to determine if the user device 120 is associated with a plurality of accounts (e.g., one or more direct demand accounts, savings accounts, credit card accounts, and/or debit card accounts). The notification circuit 112 may be configured to determine that at least one second account is associated with the user device 120. Responsive to determining the at least one second account, the notification circuit 112 may be configured to transmit a second notification 360 to the user device 120 including a request to apply the requested activity (e.g., adding an authorized user) to the one or more additional accounts. For example, as shown in FIG. 3E, the second notification 360 may include a second approval input 364 and/or a second disapproval input 366. Responsive to an input to the second approval input 364, the notification circuit 112 may be configured to approve the requested activity for all the additional accounts associated with the user device 120. Responsive to an input to the second disapproval input, the notification circuit 112 may be configured to not approve the requested activity for any of the one or more detected second accounts.

Figure 3H:
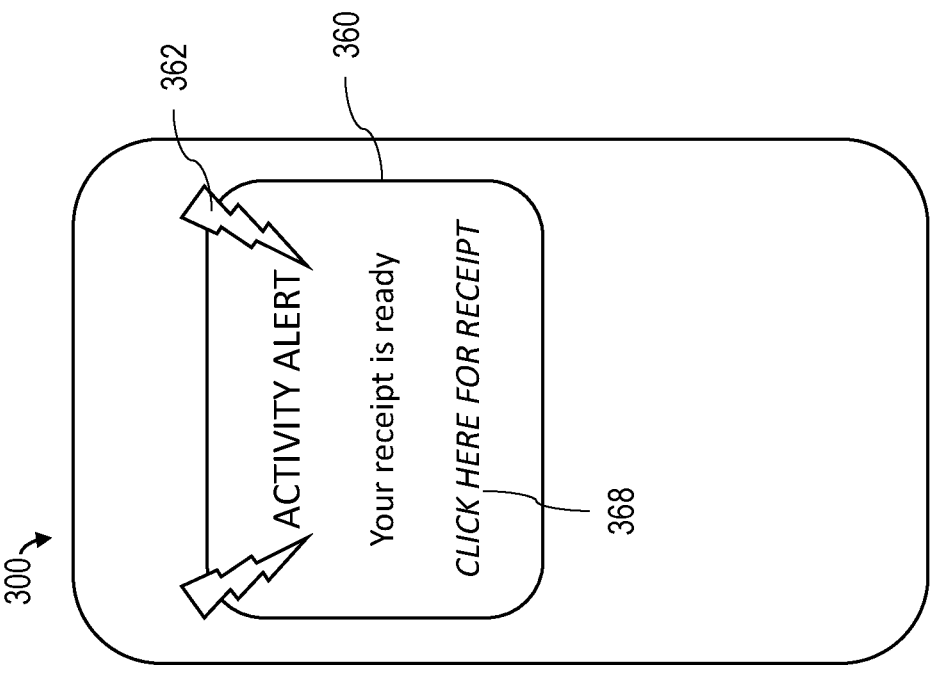
Figure 3G:
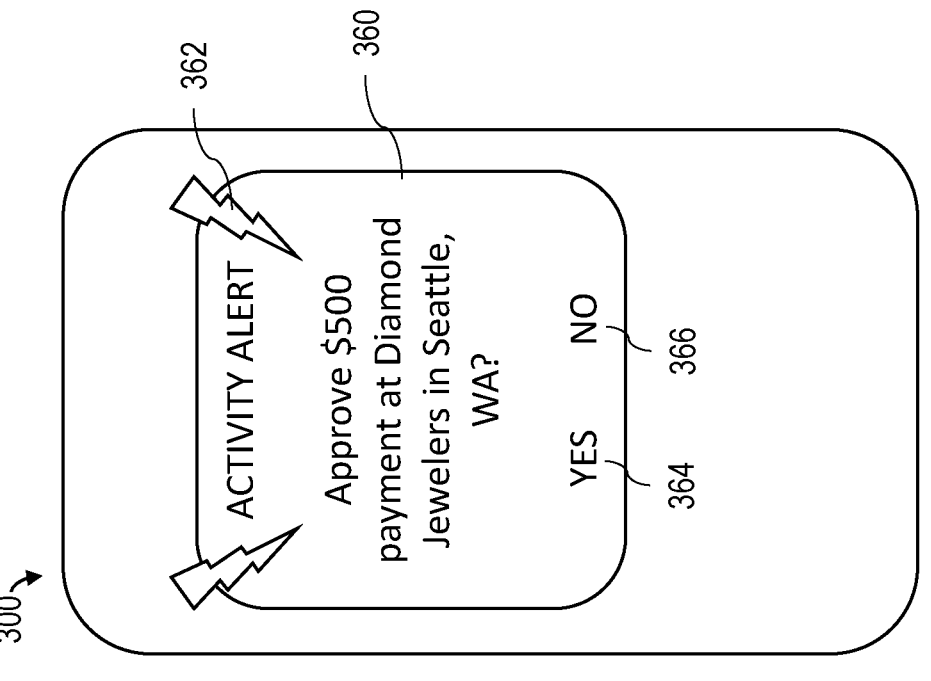

In some implementations, the notification circuit 112 may be configured to transmit a notification to a user device responsive to receiving a transaction request, in accordance with one or more notification policies. For example, as depicted in FIG. 3F, responsive to receiving a transaction request, the notification circuit 112 may be configured to transmit a notification 360 to a user device 120 indicating the transaction request. Based on the notification policy, the notification 360 may include one or more sounds and/or haptic feedback 362 (e.g., vibrations). In some implementations, the notification 360 may include at least one graphic 358. For example, the graphic 358 may correspond to a selected graphic stored in the notification settings database 106. In some implementations, as depicted in FIG. 3G, the notification circuit 112 may be configured to transmit a notification 360 responsive to implementing a notification policy indicating to notify a user of a transaction above a predetermined amount (e.g., $100).

The notification circuit 112 may be configured to provide the notification to the user device 120 including the information from the generated payload (e.g., the initial information regarding the requested activity and/or the received supplemental information from the entity computing system 130). For example, the notification circuit 112 may be configured to generate and provide the received supplemental information with the transmitted notification. As depicted in FIG. 3H, the notification circuit 112 may be configured to transmit a notification 360 including an image of a receipt and/or a selectable link 368 to a digital receipt. Responsive to receiving an input to the selectable link 368, the notification circuit 112 may be configured to provide the digital receipt on the user interface 300. While the example shown in FIG. 3H includes a selectable link to a digital receipt, the context information displayed with the notification 360 may include additional or alternative information including, but not limited to, a service or good purchased, the name of the merchant or retailer, the amount of the good or service purchased, a date and/or time of purchase, an image of the good purchased, an image associated with the merchant, and/or other information transmitted from the entity computing system 130.

Figure 3J:
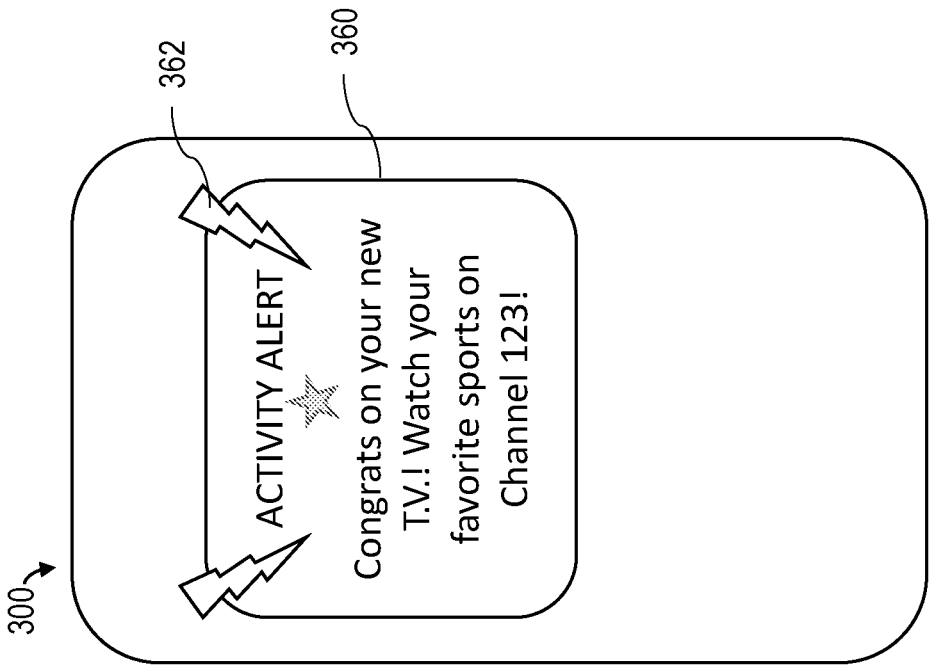
Figure 3I:
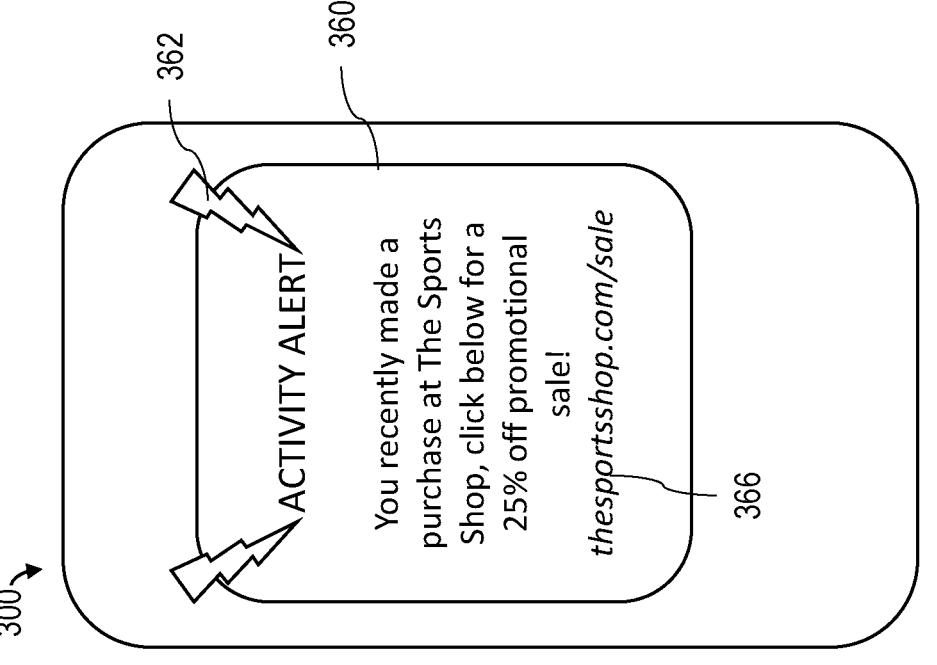

In some implementations, as depicted in FIG. 3I, the notification circuit 112 may be configured to transmit a notification 360 including an indication 366 of a promotional deal and/or sale associated with the entity computing system 130 including information associated with a promotional sale (e.g., a discount code, a specific link to a website, the dates of the sale, goods or services associated with the sale, etc.) based on the received supplemental information. As another example, the notification circuit 112 may be configured to receive information of a promotional sale responsive to transmitting an API call to the entity computing system 130. Responsive to receiving the promotional information, the notification circuit 112 may be configured to render one or more indications 366 of the promotional sale with the notification 360 responsive to receiving the supplemental information.

In some implementations, the notification 360 itself may be a selectable feature. For example, the notification circuit 112 may be configured to render the notification 360 on the user device 120 until the notification circuit 112 receives an input at any coordinate of the notification 360 (e.g., such that a user must touch and/or swipe the notification 360 for it to disappear). In some implementations, the notification circuit 112 may be configured to receive an approval of the requested activity (e.g., transaction) responsive to receiving an input to any portion of the notification 360. In some implementations, the notification circuit 112 may be configured to render the notification 360 on the user interface 300 for a predetermined time period (e.g., 5 seconds). For example, the notification circuit 112 may be configured to receive an approval of the activity responsive to a predetermined period of time expiring in which the notification circuit 112 is configured to no longer render the notification 360 on the user interface 300.

At process 238, the user device 120 (e.g., the processing circuit 127 via the client application 122) may be configured to receive a manual input to the provided notification 360. At process 240, the processing circuit 127 may be configured to transmit the manual input to the provider computing system 102. At process 220, the notification circuit 112 may be configured to determine if an approval is received. In some implementations, the notification circuit 112 may be configured to determine an approval is received responsive to receiving an input to any portion of the notification and/or responsive to receiving an input to a specific portion of the notification (e.g., to an approval input 364). In some implementations, the notification circuit 112 may be configured to determine that an approval is not received responsive to receiving no input to the notification (e.g., for a predetermined amount of time) and/or responsive to receiving an input to a portion of the notification (e.g., to a disapproval input 366). Responsive to receiving an indication that the request is not approved, the notification circuit 112 may be configured to reject the request (e.g., deny the transaction request, deny the request to add an authorized user, etc.) and/or proceed back to process 206 to receive another activity request.

At process 222, the notification circuit 112 may be configured to approve the requested activity. For example, the notification circuit 112 may be configured to approve the requested activity responsive to determining an approval was received. In some implementations, the notification circuit 112 may be configured to initiate a transfer of an approval of the request to the entity computing system 130 (e.g., during a transaction request process).

In some implementations, the notification circuit 112 may be configured to generate one or more intelligent recommendations and/or statements based on the information received from the entity computing system 130. For example, the provider computing system 102 may include one or more machine learning models stored in the provider computing system 102. The one or more machine learning models may be trained based on known inputs and known outputs such that the machine-learning model can learn how to predict known outputs given known inputs. Once the machine-learning model has learned how to predict known input-output pairs, the machine-learning model can operate on unknown inputs to predict an output. Training inputs and actual outputs may be provided to the machine-learning model. For example, training inputs may include product types, images of products, service types, captions to describe each product or service, metadata, and/or other data. Training outputs may include recommendations or statements associated with the product types, images of products, service types, captions to describe each product or service, and/or metadata. Thus, the machine-learning model may be trained to predict recommendations or statements based on the training inputs and actual outputs used to train the machine-learning model. By way of example, the machine learning model may be trained using training data associated with common products purchased. For example, the training input may be or include an image of a television and the training output may be or include a recommendation to watch a new show, channel, or sports game.

The notification circuit 112 may be configured to use the machine learning models to generate intelligent outputs based on the information received from the entity computing system 130. For example, as depicted in FIG. 3J, the notification circuit 112 may be configured to transmit a notification 360 including an intelligent recommendation associated with the purchase. By way of example, the notification circuit 112 may be configured to receive an indication that the transaction request is associated with a new television. The notification circuit 112 may be configured to use the machine learning models to generate an intelligent recommendation or statement (e.g., "Watch your favorite sports on Channel 123!", etc.).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system associated with a provider institution, the computing system comprising:
a network interface;
a database structured to store notification settings of a plurality of accounts held by the provider institution; and
at least one processing circuit comprising at least one processor and at least one memory, the at least one memory structured to store instructions that are executable to cause the at least one processor to:
receive, via the network interface, from a first device coupled to the computing system, a first notification setting associated with a first activity type, the first notification setting defining a first threshold limit and a first feedback type;
receive, via the network interface, from the first device, a second notification setting associated with a second activity type, the second notification setting defining a second threshold limit and a second feedback type that are different from the first threshold limit and the first feedback type;
establish, via the network interface, a communication link between the first device and a second device based on an indication of a physical interaction between the first device and the second device,
responsive to establishing the communication link, receive, via the network interface, from the second device, a request to perform an activity associated with an account of a user of the plurality of accounts;
determine, based on the activity matching the first activity type, a notification policy based on the first notification setting;
transmit, via the network interface, a request for information regarding the activity to the second device;
receive, via the network interface, information regarding the activity from the second device based on the request;
determine, based on the received information, that the activity exceeds the first threshold limit;
generate a data payload comprising the received information regarding the activity and initial information associated with the request to perform the activity;
tokenize at least a portion of the data payload; and
provide, via the network interface, a notification comprising information from the tokenized data payload to the first device, the notification causing the first device to render haptic feedback and visual feedback based on the first feedback type.

2. The computing system of claim 1, wherein the instructions further cause the at least one processor to:
receive, via the network interface and via a manual input to the first device, an indication to approve the request to perform the activity; and
transmit, via the network interface, to the second device, an approval to perform the activity.

3. The computing system of claim 2, wherein the notification comprises a selectable feature to approve the request and wherein the manual input to the first device comprises an input to the selectable feature.

4. The computing system of claim 1, wherein the activity comprises at least one of a transaction, updating a spending limit associated with the account, or adding an authorized user to the account.

5. The computing system of claim 1, wherein the request to perform the activity is associated with a first payment card of the account and the instructions further cause the at least one processor to:

determine, based on account information stored in the database, a second payment card associated with the account of the user; and transmit, to the first device, via the network interface, a second notification comprising a selectable feature to apply the activity to the first payment card and the second payment card.

6. The computing system of claim 1, wherein the information regarding the activity received from the second device based on the request comprises at least one of an identifier associated with the activity, a link to a digital receipt associated with the activity, or an image associated with the activity.

7. The computing system of claim 1, wherein the instructions, when executed, further cause the at least one processor to:

receive, via the network interface, from the second device, a second request to perform a second activity associated with the account;

determine, based on the second activity matching the second activity type, a second notification policy based on the second notification setting of the account of the user;

receive, via the network interface, second information regarding the second activity from the second device based on the second request;

determine, based on the received second information, that the second activity exceeds the second threshold limit; and provide, via the network interface, a second notification to the first device, the second notification causing the first device to render visual feedback based on the second feedback type.

8. A computer-implemented method, comprising:

receiving, by a computing system associated with a provider institution, from a first device coupled to the computing system, a first notification setting associated with a first activity type, the first notification setting defining a first threshold limit and a first feedback type;

receiving, by the computing system, from the first device, a second notification setting associated with a second activity type, the second notification setting defining a second threshold limit and a second feedback type that are different from the first threshold limit and the first feedback type;

establishing, by the computing system, a communication link between the first device and a second device based on an indication of a physical interaction between the first device and the second device, responsive to establishing the communication link, receiving, by the computing system, from the second device, a request to perform an activity associated with an account of a user of a plurality of accounts held by the provider institution;

determining, by the computing system, based on the activity matching the first activity type, a notification policy based on the first notification setting;

transmitting, by the computing system, a request for information regarding the activity to the second device;

receiving, by the computing system, information regarding the activity from the second device based on the request;

determining, by the computing system, based on the received information, that the activity exceeds the first threshold limit;

generating, by the computing system, a data payload comprising the received information regarding the activity and initial information associated with the request to perform the activity;

tokenizing, by the computing system, at least a portion of the data payload;

and providing, by the computing system, a notification comprising information from the tokenized data payload to the first device, the notification causing the first device to provide at least one of haptic feedback or visual feedback associated with the notification based on the first feedback type.

9. The method of claim 8, further comprising:

receiving, by the computing system and via a manual input to the first device, an indication to approve the request to perform the activity; and transmitting, by the computing system, to the second device, an approval to perform the activity.

10. The method of claim 9, wherein the notification comprises a selectable feature to approve the request and wherein the manual input to the first device comprises an input to the selectable feature.

11. The method of claim 8, wherein the activity comprises at least one of a transaction, updating a spending limit associated with the account, or adding an authorized user to the account.

12. The method of claim 8, wherein the request to perform the activity is associated with a first payment card of the account and the method further comprises:

determining, by the computing system, based on account information stored in a database, a second payment card associated with the account of the user; and transmitting, by the computing system, to the first device, a second notification comprising a selectable feature to apply the activity to the first payment card and the second payment card.

13. The method of claim 8, wherein the information regarding the activity received from the second device based on the request comprises at least one of an identifier associated with the activity, a link to a digital receipt associated with the activity, or an image associated with the activity.

14. The method of claim 8, wherein the method further comprises:

receiving, by the computing system, from the second device, a second request to perform a second activity associated with the account;

determining, by the computing system, based on the second activity matching the second activity type, a second notification policy based on the second notification setting of the account of the user;

receiving, by the computing system, second information regarding the second activity from the second device based on the second request;

determining, by the computing system, based on the received second information, that the second activity exceeds the second threshold limit; and providing, by the computing system, a second notification to the first device, the second notification causing the first device to render visual feedback based on the second feedback type.

15. A non-transitory computer readable medium storing instructions that, when executed by at least one processor, cause operations comprising:

receiving, via a network interface, from a first device, a first notification setting associated with a first activity type, the first notification setting defining a first threshold limit and a first feedback type;

receiving, via the network interface, from the first device, a second notification setting associated with a second activity type, the second notification setting defining a second threshold limit and a second feedback type that are different from the first threshold limit and the first feedback type;

establishing, via the network interface, a communication link between the first device and a second device based on an indication of a physical interaction between the first device and the second device, responsive to establishing the communication link, receiving, via a network interface, from the second device, a request to perform an activity associated with an account of a user of a plurality of accounts held by a provider institution;

determining, based on the activity matching the first activity type, a notification policy based on the first notification setting;

transmitting, via the network interface, a request for information regarding the activity to the second device;

receiving, via the network interface, information regarding the activity from the second device based on the request;

determining, based on the received information, that the activity exceeds the first threshold limit;

generating a data payload comprising the received information regarding the activity and initial information associated with the request to perform the activity;

tokenizing at least a portion of the data payload; and providing, via the network interface, a notification comprising information from the tokenized data payload to the first device, the notification causing the first device to provide haptic feedback and visual feedback based on the first feedback type.

16. The non-transitory computer readable medium of claim 15, wherein the instructions, when executed, further cause operations comprising:

receiving, via the network interface and via a manual input to the first device, an indication to approve the request to perform the activity; and transmitting, via the network interface, to the second device, an approval to perform the activity.

17. The non-transitory computer readable medium of claim 16, wherein the notification comprises a selectable feature to approve the request, and wherein the manual input to the first device comprises an input to the selectable feature.

18. The non-transitory computer readable medium of claim 15, wherein the activity comprises at least one of a transaction, updating a spending limit associated with the account, or adding an authorized user to the account.

19. The non-transitory computer readable medium of claim 15, wherein the information regarding the activity received from the second device based on the request comprises at least one of an identifier associated with the activity, a link to a digital receipt associated with the activity, or an image associated with the activity.

20. The non-transitory computer readable medium of claim 15, wherein the instructions, when executed, further cause operations comprising:

receiving, via the network interface, from the second device, a second request to perform a second activity associated with the account;

determining, based on the second activity matching the second activity type, a second notification policy based on the second notification setting;

receiving, via the network interface, second information regarding the second activity from the second device based on the second request;

determining, based on the received second information, that the second activity exceeds the second threshold limit; and providing, via the network interface, a second notification to the first device, the second notification causing the first device to render visual feedback based on the second feedback type.

* * * * *